Sept. 28, 1937.　　　　G. M. DEMING　　　　2,094,269
GAS PRESSURE REGULATOR
Filed June 30, 1931　　　3 Sheets-Sheet 1

INVENTOR
George M. Deming
BY
ATTORNEY

Sept. 28, 1937.  G. M. DEMING  2,094,269

GAS PRESSURE REGULATOR

Filed June 30, 1931  3 Sheets-Sheet 3

INVENTOR
George M. Deming
BY
ATTORNEY

Patented Sept. 28, 1937

2,094,269

UNITED STATES PATENT OFFICE 2,094,269

GAS PRESSURE REGULATOR

George M. Deming, East Orange, N. J., assignor to Air Reduction Company, Incorporated, New York, N. Y., a corporation of New York Application June 30, 1931, Serial No. 547,852

14 Claims. (Cl. 50—11)

This invention relates to a heavy-duty gas regulator apparatus capable of dealing with high inlet pressures and of delivering gas at high, reduced pressures. Inlet pressures up to several thousand pounds per square inch, delivery pressures up to several hundred pounds, and flows ranging from about 8 to 10,000 cubic feet per hour will indicate the nature of the problem.

Existing types of gas pressure regulators are not adapted for such service and can not well be made to take care of it by building them larger. To obtain a delivery pressure of 400 lbs. at an outflow of 10,000 cubic feet per hour, for example, with a gas pressure regulator of standard construction, assuming that the regulator diaphragm was sufficiently large to realize a fairly satisfactory quality of regulation, would mean an exertion of over 20,000 lbs. by the adjusting screw, and under this load the threads would last only a very short time. Great manual effort would be required to adjust such a regulator. Furthermore, the problem of providing a large enough diaphragm, which could successfully resist an operating pressure of 400 lbs. per square inch and yet not be too stiff, would present serious difficulty.

The object of the invention is to provide a regulating apparatus which is well adapted for the heavy-duty field, which is durable and easily adjusted, and which gives superior regulation.

The invention makes use of a combination of a master regulator, which does not require the customary regulating spring and adjusting screw, and a pilot regulator which has a regulating spring and preferably an adjusting screw, the inlets of both regulators being preferably connected with the high pressure main or source, and the reduced pressure side of the pilot regulator communicating with a regulating pressure chamber above the diaphragm of the master regulator, the adjustable reduced pressure of the pilot regulator thus taking the place of a regulating spring and adjusting screw in the master regulator. Another feature which avoids the use of a stiff diaphragm is a lever connection which affords the diaphragm a mechanical advantage in operating the valve. The organization is such that the gas flow through the pilot regulator, which flow must exist, is very low, in consequence of which its diaphragm can be small, and the load on the threads of its adjusting screw can be moderate, for example about 200 lbs. as against about 20,000 lbs. on the screw of a theoretical single regulator for similar service.

The smallness of the flow through the pilot regulator eliminates what is known as pre-cooling effect in the operation of the pilot regulator. The nozzle or orifice of the master regulator being necessarily large, pre-cooling in the master regulator does not affect its operation. Consequently, it remains only to isolate the body of the pilot regulator, either by physical separation or by heat-insulation, to insure that the regulation effected by means of the combination of apparatus will not suffer from pre-cooling.

A high degree of perfection and reliability in the regulation also results from a preferable combination of two different types of regulators, which cooperate in such manner that a tendency of the delivery pressure of the master regulator to decrease with falling cylinder pressure or other source pressure is approximately compensated by a progressively increasing pressure applied above the master diaphragm by the pilot regulator. In this way a much more even operating pressure can be maintained than would be possible with a single regulator. In carrying out this part of the invention, the master regulator has been designed as a regulator of the direct type, whereas the pilot regulator has been designed as a regulator of the inverse type.

A regulator of the direct type, as understood in the art, is one in which the valve element closes against the higher pressure, being urged to the nozzle or orifice by a compensating spring when the diaphragm is flexed outward by the gas pressure in the reduced pressure chamber, and being moved away from the orifice by the regulating pressure imposed on the diaphragm. In one class of direct type regulators the operative connection between the diaphragm and the valve element is a rectilinearly movable stirrup; in another class it is a lever. A regulator of the inverse type is understood to be one in which the valve element closes with the higher pressure, a so-called "marginal" spring being usually employed to act on it in the same direction, and the valve element being usually unseated through a thrust pin which extends through the nozzle orifice to bear against the diaphragm. A regulator of the inverse type gives rise to a rising delivery pressure under dropping cylinder pressures, whereas with a direct type regulator the delivery pressure drops under the same conditions. By the present invention the pilot regulator is caused to give about the correct amount of increase in pressure above the diaphragm of the master regulator to neutralize the tendency of the delivery pressure to drop. Further advantage in regulation is obtained by adopting a regulator of the lever class for the master regulator.

Another object of the invention is to provide the master regulator with a simple and very effective dampening means, for preventing vibratory discharge. This feature may also be applied to other gas pressure regulators or reducing valves.

Other objects and features of the invention will become apparent from the accompanying drawings or from the description of the illustrative embodiments of the invention.

Figure 4:
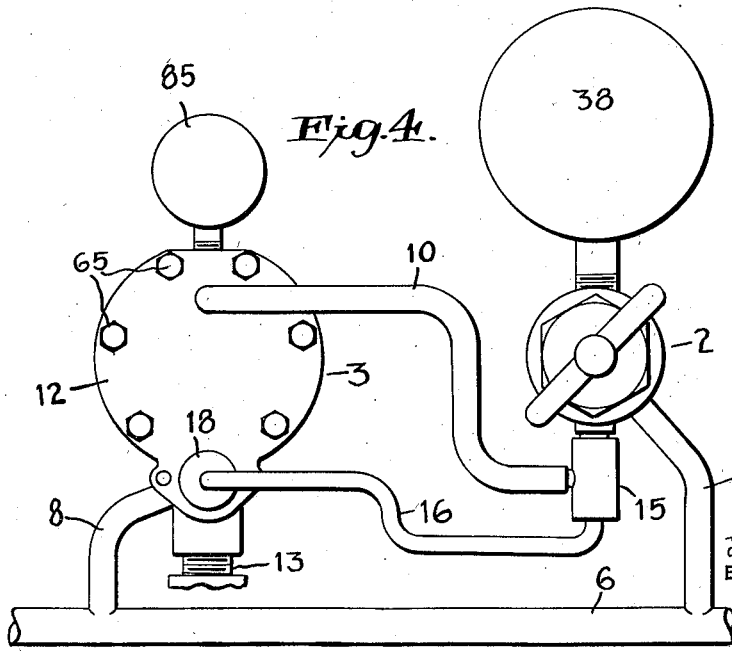

Fig. 4 may be termed a plan view of the combined apparatus; and

Fig. 5 is an axial section through an alternative form of the master regulator.

The pilot regulator is marked 2 and the master regulator is marked 3. These two regulators might be built as one piece of apparatus, particularly if heat insulation were interposed to keep the inlet and nozzle spaces of the pilot regulator from being chilled by expansion of the gas in the master regulator. The advantages of isolating the pilot regulator from the master regulator are secured in the apparatus shown in the drawings by separating them in space. The inlet connection 4 of the pilot regulator and the inlet connection 5 of the master regulator are shown connected with a high-pressure main 6 by pipes 7 and 8. The outlet 9 of the pilot regulator is connected by a pipe 10 with a nipple 11 fixed in an opening in the cover plate 12 of the master regulator. The openings through the pipe 10 and the connecting fittings, such as the nipple 11, are large enough in proportion to the gas flow, so that the pilot regulator is in unrestricted communication with the master regulator and the full delivery pressure of the pilot regulator is delivered to the master regulator through the pipe 10. 13 is the outlet from the master regulator to the distributing line 14.

In the form of the invention illustrated in Figs. 1–4, the flow from the pilot regulator is conducted from the outlet fitting 15 through a pipe 16 to the outlet portion of the master regulator 3. The end of this pipe may be connected to a nipple 17 held in a spring chamber 18 formed on the cover plate 12. This minor flow can as well be delivered into any part of the reduced pressure space of the master regulator or into the distributing line leading therefrom. Indeed, if it were not for economy, and also for another consideration which will be indicated later on, the discharge from the pilot regulator might be to atmosphere.

A matter of importance in this connection is that the flow through the pilot be kept low. This is accomplished by the provision of a very fine fixed restriction in the path of outflow from the pilot regulator, but preferably not in the path through which control pressure is communicated from the pilot regulator to the regulating pressure chamber 19 between the cover 12 and the diaphragm 20 of the master regulator. In the embodiment of Figs. 1–4 a bleeder port 21 is made in the end wall 22 of the fitting 15, this port being at the entrance to the flow pipe 16 and beyond the functionally unrestricted entrance 23 to the regulating pressure pipe 10. In practice, this bleeder port is as small a hole as can be drilled.

It is not necessary to locate the bleeder port in this particular position, or even to have the pipe 16 in addition to the pipe 10. Fig. 5 illustrates a form of master regulator 3ª in which a bleeder port 21ª is made in a central button 24 of the diaphragm 20ª. The pipe 10 coming from the pilot regulator is connected to the nipple 11ª of the cover 12ª, forming an entrance to the regulating pressure chamber 19ª above the master regulator diaphragm, and the restricted escape of reduced pressure gas from the pilot regulator takes place from this chamber through the diaphragm into the reduced pressure chamber of the master regulator and thence to the distributing line 14. In such a case, the pipe 10 serves both as a pressure-communicating line and as a low-flow line, and the pipe 16 is omitted. Other locations for the bleeder port can be selected, provided preferably, however, that it is not placed as a constriction in the free communication way between the reduced pressure chamber of the pilot regulator and the regulating pressure chamber of the master regulator.

The first reason for holding the flow through the pilot regulator to a low value in any of these ways is to reduce or practically eliminate chilling of the high pressure gas in the pilot regulator approaching the orifice of the nozzle 25, as a result of expansion of the gas leaving this orifice and entering the reduced-pressure chamber 26 of the pilot regulator. When such chilling or refrigerating effect is pronounced in a gas regulator, it freezes moisture in the gas, forming minute crystals which clog the nozzle and sometimes freeze the seat or valve element 27 to the orifice. It is a source of much irregularity in the performance of oxygen and other gas regulators, and is the more troublesome with the smaller sizes of nozzle orifices. By restricting the size of the bleeder, the rate of flow through the pilot regulator is restricted and consequently the self pre-cooling of this regulator is minimized, to the end that the regulation of the pilot and hence of the master regulator may be satisfactory. When to this is added the thermal isolation of the pilot regulator body, or at least of its high-pressure space portion, from the body of the master regulator,—in which heavy pre-cooling produces no detrimental results because of the largeness of the orifice 28,—a regulator combination is obtained which is practically free from fluctuations under conditions that would present serious difficulties for the usual types of regulators.

The regulators shown in Figs. 1–3 will be described in more detail.

The pilot regulator 2 is, as previously stated, preferably of the inverse type. It is properly proportioned in relation to the master regulator, but its features of construction need differ little from known single regulators of its class. The body of the regulator is marked 30. Into a chamber 31 in one end is screwed a plug 32 having a passage 33 through it, this plug terminating in the external connection 4 to receive the inlet pipe 7 which supplies high pressure gas to the pilot. A guide chamber 34 guides the holder 35 of the seat 27, these parts constituting a valve member coacting with the inlet lip of the nozzle 25. A passage 36 connects the inlet chamber 31 with a chamber 37, which surrounds the end of the nozzle to admit gas to the nozzle when the seat moves away. The high-pressure regulator 38 of the gauge combination is shown connected with this space.

The seat is urged to the nozzle by a light spring 40, termed a marginal spring, and is more powerfully urged in this direction by the pressure of the gas. It is moved away from the nozzle by the action of the relatively heavy regulating spring 42 transmitted through the diaphragm 43, its back plate 44 and button 45, and a conventional thrust-pin 46, which is guided in the orifice of the nozzle 25.

The gas which passes through this nozzle enters the reduced-pressure chamber 26 beneath the diaphragm 43. The connection 9 to the pipe 10, or to the pipes 10 and 11, is in communication with this chamber. The margin of the diaphragm 43 is clamped between a seat 47 in the upper part of the regulator body (terms of orientation having, of course, no absolute significance), and the end rim of a cap 48 which is screwed into the cavity of this part of the body. The regulating spring 42 is confined in the chamber of the cap between the diaphragm back plate 44 and a plate 50, the latter receiving the thrust of the manually adjustable screw 51, which engages a threaded opening in the cap.

At this point a special matter will be mentioned. This has to do with a relation between the bleeder port 21 or 21ª and the gas passage through the nozzle 25 between the high and reduced pressure spaces of the pilot regulator. The gas passage between the thrust pin 46 and the orifice wall of the nozzle, which it almost fills, is reduced so low that the effective passage is small as compared with the size of the bleeder port. The purpose of this is that excessive pressure may not develop between the pilot regulator and the master regulator as a result of possible leaks in the pilot seat. Any such excess pressure will be relieved through the bleeder port.

Figure 1:
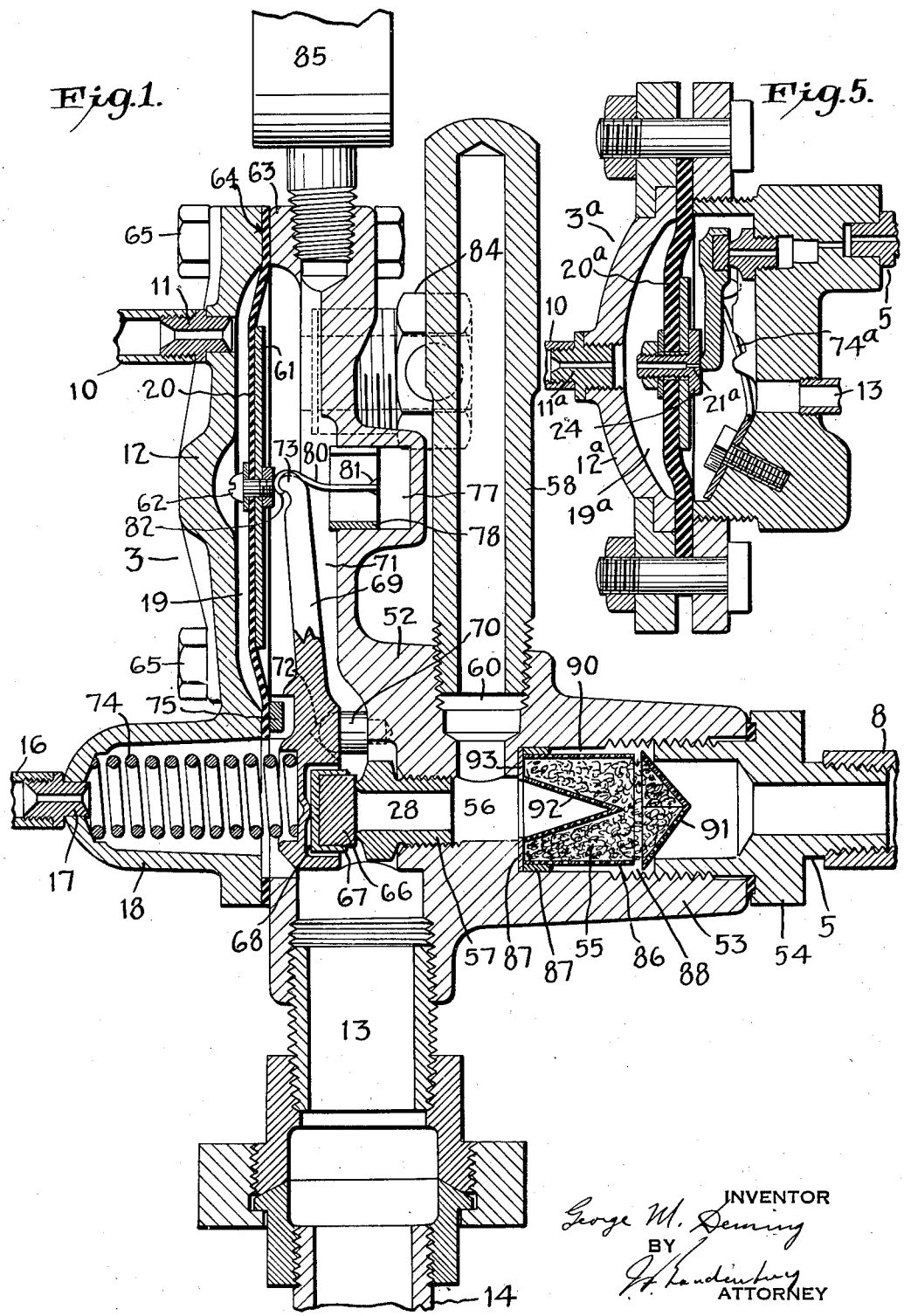
Fig. 1 is a section in what may be termed an axial plane through the master regulator.
Figure 2:
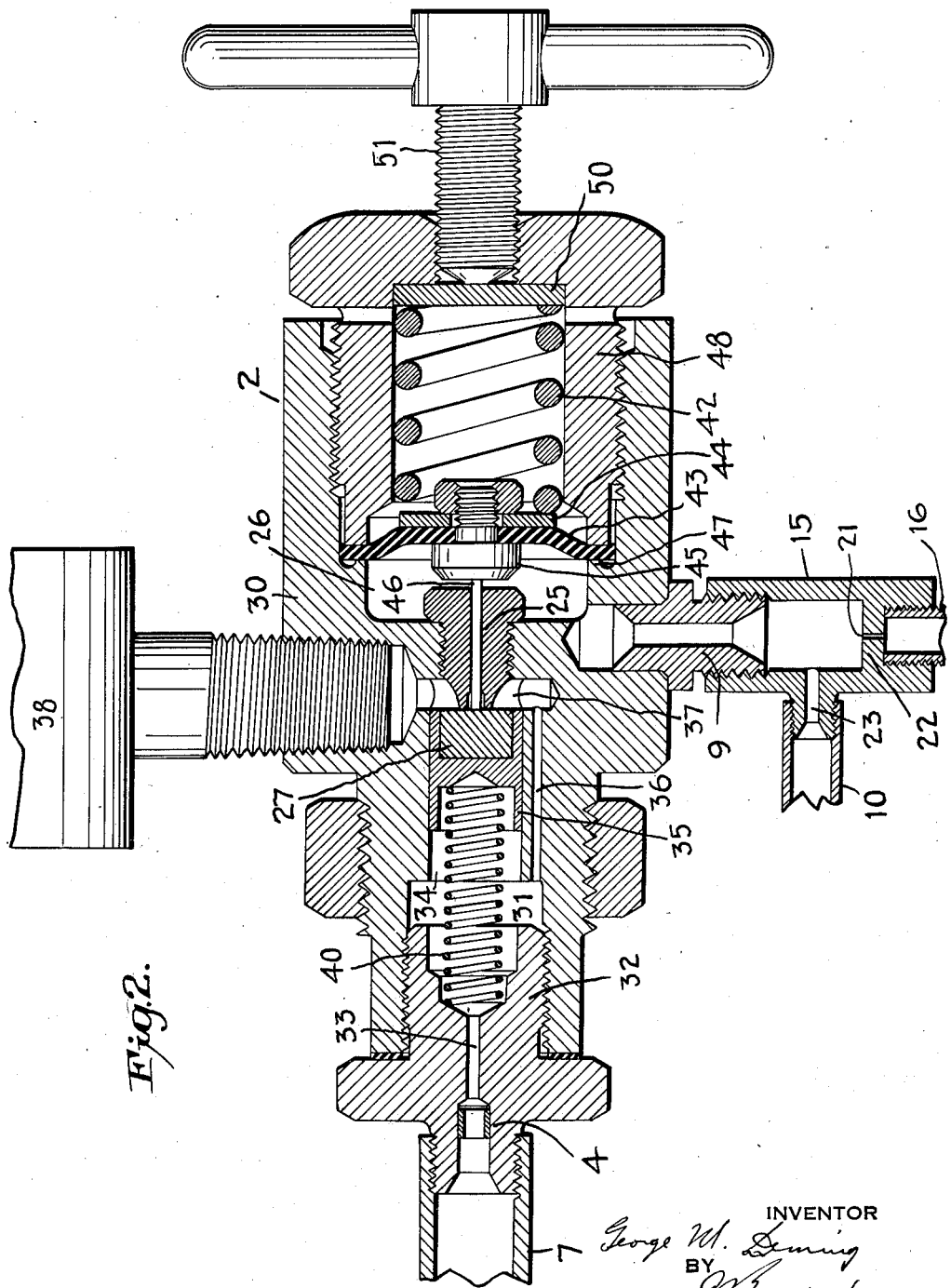
Fig. 2 is a section in an axial plane through the pilot regulator.
Figure 3:
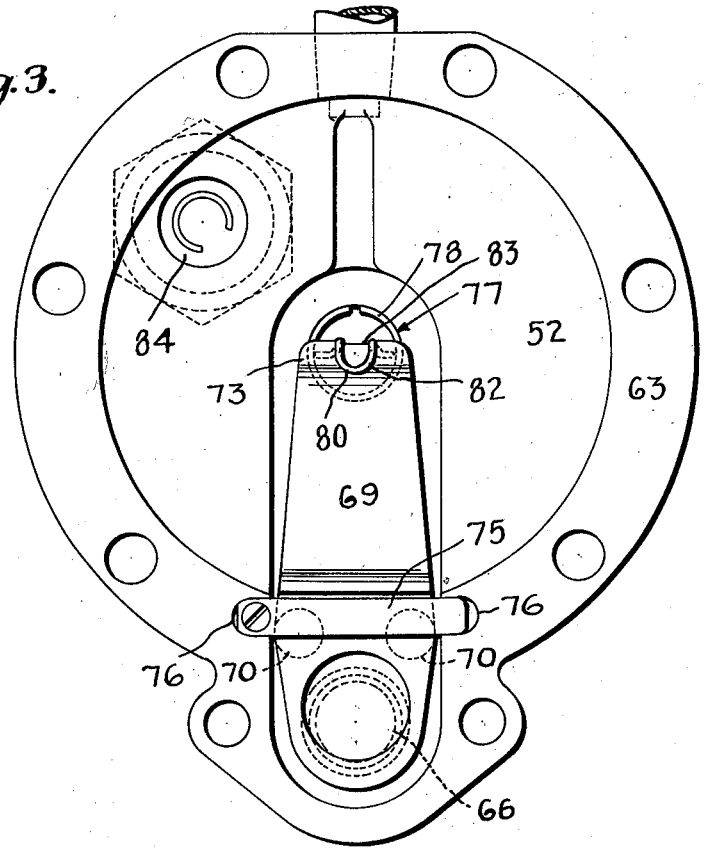
Fig. 3 is a plan view of the master regulator with its cover removed.

For performing the functions of the master regulator of the present invention a regulator of the lever type is particularly advantageous, and a specially developed regulator of this class is illustrated in Figs. 1 and 3. Certain features of my Patents No. 1,745,785, dated February 4, 1930, and No. 1,839,837, dated January 5, 1932, are preferably included.

The body 52 of this regulator has a hollow extension 53 into which is screwed a hollow plug 54 carrying the inlet connection 5 to which the pipe for admitting high pressure gas to this regulator is attached. In the chamber of the extension 53 is placed the glass wool filter 55 of my former patent. A large bore 56 in the body passes the high-pressure gas leaving the filter to the large orifice 28 of the nozzle 57. A closed tube 58 having its open end screwed into a recess 60 communicating with the space 56 provides the dead-end passage disclosed in my aforesaid patent.

The diaphragm 20 is sustained by a plate 61 secured to it by a central screw 62 with nut and washer. The margin of the diaphragm is clamped between an incomplete annular seat 63 on the body and a cooperating annular face 64 on the cover 12, the body and cover being drawn together by bolts 65.

The seat or valve element 66 is held in a cup 67, which in turn is rockingly confined in a recess 68 in the short arm of a lever 69 of the first class. This lever is fulcrumed on the rounded ends of two posts 70 rising from the bottom of the reduced pressure chamber 71, the under side of the lever having conical recesses 72 which work frictionally on the protuberances. This is an embodiment in reverse of the dampening fulcrum disclosed in my Patent No. 1,839,837. The rounded crest 73 of the extremity of the long arm of the lever bears against the center of the diaphragm construction, so that movement of the diaphragm, compelled by pressure applied to it in the space 19 from the pilot regulator, moves the seat away from the nozzle. The seat or valve member is urged to the nozzle by a compensating spring 74 located in the hollow extention 18 of the cover and pressing upon the short arm of the lever.

In order to secure an advantageous relation between the size of the nozzle orifice, the length of the lever and the diameter of the diaphragm, the nozzle and seat are disposed outside the circuit of the diaphragm, and consequently the annular support 63 for the diaphragm is omitted or cut away at this region to permit the lever to extend through. Marginal support and clamping of the diaphragm are contrived at this gap by placing a bridge bar 75, the ends of which are supported and retained in recesses 76 in the body, so that the face of the bar is flush with the face of the clamping seat 63.

Because of the heavy duty of this regulator, the useful dampening effect of the fulcrum which has been described is not adequate in itself to prevent chattering. Accordingly, a very simple and effective dampening device is provided. The low pressure cavity of the body of the regulator is formed or provided with a pot or guide 77 having a smooth, cylindrical inner wall, and in this guide there is compressed a split, cylindrical resilient annulus 78, which is connected with the lever 69 to partake of its movements. The connection may take the form of a tongue 80, preferably bent from wire. As shown, the wire is bent into the form of a bail or U, the limbs of which are soldered at 81 to the inside of the movable dampening element. At the free end, this tongue is bent to form a curved hook 82, which engages over the crest 73 of the lever in a manner to guard against disengagement and to permit of relative movement. By catching the hook in a notch 83 in the tail end of the lever lateral displacement is prevented. In this particular construction the hook of the tongue connection is retained firmly between the lever and the central projection of the diaphragm, so that the dampening element follows all movements of the lever. The resilient outward pressure of the split annulus produces sufficient friction between the smooth surfaces so that the sliding of one on the other effectually suppresses the tendency to vibratory discharge, which in this regulator might otherwise be quite violent.

Connected with the reduced pressure cavity of the master regulator is a bursting disc device 84, which will serve to relieve any dangerous excess pressure resulting from valve seat leaks in either the master regulator or in the pilot regulator. Also connected with this chamber is the low pressure gauge 85 of the regulator combination.

A tubular, perforated screen 86 forms a holder for the fibers of the filter 55. The down-stream end of this tube is held frictionally or otherwise in a spacer ring 87 which is disposed in the end of the filter chamber 88, where a shoulder surrounds the passage 56 leading to the nozzle orifice 28. In this way the tubular screen is separated from the sides of the filter chamber, leaving an annular space 90 to which the entering high pressure gas has access so that it can enter the filter from all sides. At the upstream end the filter mass is retained by a hollow, pyramidal, perforated screen 91 which projects upstream and which is separate from the tubular holder 86 and is kept in position by the inner edge of the hollow plug 54. The pyramidal or other suitable shape of the retainer 91 permits the gas to enter the space 90 around the screen 86, and the gas also passes directly through the openings of the retainer into the upstream end of the filter. The egress of the gas from the filter is much facilitated by a perforated, hollow, conical screen, or exit-enlarger 92, which extends from the entrance to the passage 56 rearward within the mass of fibers held in the tubular screen 86. This element is held in place by being united to an annular disc 93, which is held against the shoulder 90 by the spacing ring 87.

The form of master regulator shown in Fig. 5 is substantially like the regulator illustrated in my Patent No. 1,839,837. The type of compensating spring 74ᵃ is like that disclosed in the said application. This regulator need not be described in detail, since the purpose of this view is simply to illustrate the fact that the bleeder port 21ᵃ, which restricts the flow through the pilot regulator to a low value, may be disposed as a restricted escape from the regulating pressure chamber 19ᵃ of the master regulator.

One other advantage of the very small bleeder port in the combination is this: During substantial or large service flows through the master regulator, the normal functioning of the apparatus, which may be termed combination regulation, prevails, that is to say the master regulator regulates the pressure of the gas delivered to the distributing line under the control of the pilot regulator. Below a certain value of total discharge, or cut-off point, the pilot may alone serve to regulate the pressure of the outflow. This will be understood when it is appreciated that for the master regulator to function, the pressure differential across the master diaphragm 20 must exceed a definite amount in order to overcome that portion of the stress of the compensating spring 74 which is not balanced by the gas thrust of the high pressure gas within the regulator orifice 28. In other words, the gas pressure in the regulating pressure chamber 19 must be sufficiently greater than the pressure in the reduced-pressure chamber 71 to keep the seat 66 from closing tight against the lip of the nozzle 57. The moment this differential decreases as a result of a greatly decreased rate of demand on the regulator there will result an insufficient pressure on the lever to keep the seat away from the nozzle. Consequently, at these low demands the pilot regulator alone will supply the gas being used. Having observed that below a certain value of master diaphragm differential the pilot functions alone, it remains to note only that for any given differential across an orifice, the discharge through the orifice depends upon the size of the orifice. Consequently, the bleeder-port 21 or 21ᵃ, as a feeder for the distributing system, should be small if the range of regulation is to extend down to low rates of demand.

Among the advantages of the invention may be mentioned the following:

The large diaphragm of the master regulator can be of low stiffness, which conduces to superior regulation. The use of a light flexible diaphragm in the master regulator is possible because it does not have to sustain the concentrated load of a heavy regulating spring, which in the absence of gas pressure in the reduced pressure chamber would be entirely unbalanced. In this invention the master diaphragm is exposed to gas pressures on opposite sides, the difference between which pressures is not large, and when pressure does not exist beneath the diaphragm (reduced pressure chamber) it also does not exist above the diaphragm (regulating pressure chamber).

The tendency of the pressure delivered by the master regulator to drop with falling cylinder pressure is compensated by the tendency of the pressure applied to the master diaphragm to rise under the same conditions.

Because of these reasons, among others, the fundamental regulation is of high quality.

The regulator combination is immune from pre-cooling effect disturbing to regulation. This is because the master regulator has so large a nozzle orifice that severe chilling does not cause the orifice to clog with ice crystals, whereas in the pilot regulator the flow is kept so low that it develops practically no self-precooling, in addition to which it is thermally isolated or insulated from the master regulator so that it is not chilled by the latter.

The pilot regulator alone is able to regulate the service pressure at low consumptions, below the cut-off point at which the master regulator valve remains closed. At ordinary or large flows the two regulators work in conjunction, one controlling the other and mutually neutralizing their individual deviations.

The adjusting screw of the pilot regulator is subjected to only moderate stress, well within its strength, whereas the adjusting screw of a large single regulator would be called upon to sustain prohibitive pressure and would have no useful life. The pilot regulator screw can be turned with ease, whereas a screw on a single regulator proportioned to perform the same duty as this combination of regulators would be almost impossible to turn by hand.

The invention is not necessarily limited to an adjustable regulator apparatus. If the adjusting screw 51 of the pilot regulator were omitted, and if a regulating spring 42 of predetermined value were employed, the apparatus would function as a non-adjustable pressure regulator or reducing-valve.

Finally, in some instances, it is possible that the pilot regulator might operate on a pressure fluid other than the gas which passes through the master regulator, in which event the discharge from the pilot regulator would not pass to the distributing system served by the master regulator.

Various other changes and modifications will suggest themselves to those skilled in the art.

I claim:

1. Gas pressure regulator apparatus of the kind described, comprising the combination of a master regulator of the direct type and a pilot regulator of the inverse type, each of said regulators having a diaphragm, a high-pressure inlet, a reduced-pressure chamber on one side of the diaphragm and a connecting orifice between the high-pressure inlet and the reduced-pressure chamber, a valve member cooperating with such orifice and an operative connection between the diaphragm and the valve member, the pilot regulator having a regulating spring to act on its diaphragm in opposition to pressure in its reduced-pressure chamber, the master regulator having a regulating-pressure chamber at the opposite side of its diaphragm from its reduced-pressure chamber so that the diaphragm is exposed to gas pressure from both sides, means providing a communication passage between the reduced-pressure chamber of the pilot regulator and the regulating-pressure chamber of the master regulator, and means providing a restricted escape port in bleed-out relation from the reduced pressure chamber of the pilot regulator.

2. Gas pressure regulator apparatus of the kind described, comprising the combination of a master regulator of the direct type and a pilot regulator of the inverse type, each of said regulators having a diaphragm, a high-pressure inlet, a reduced-pressure chamber on one side of the diaphragm and a connecting orifice between the high-pressure inlet and the reduced-pressure chamber, a valve member cooperating with such orifice, and an operative connection between the diaphragm and the valve member, such operative connection in the case of the master regulator being by a lever, the pilot regulator having an adjusting spring to act on its diaphragm in opposition to pressure in its reduced-pressure chamber, the master regulator having a regulating-pressure chamber at the opposite side of its diaphragm from its reduced-pressure chamber so that the diaphragm is exposed to gas pressure from both sides, means providing a communication passage between the reduced-pressure chamber of the pilot regulator and the regulating-pressure chamber of the master regulator, and means providing a restricted escape port in bleed-out relation from the reduced-pressure chamber of the pilot regulator.

3. Gas pressure regulator apparatus of the kind described, comprising the combination of a master regulator of the direct type and a pilot regulator of the inverse type, each of said regulators having a diaphragm, a high-pressure inlet, a reduced-pressure chamber on one side of the diaphragm and a connecting orifice between the high-pressure inlet and the reduced-pressure chamber, a valve member cooperating with such orifice, and an operative connection between the diaphragm and the valve member, such operative connection in the case of the pilot regulator being a thrust pin passing through the orifice, the pilot regulator having an adjusting spring to act on its diaphragm in opposition to pressure in its reduced-pressure chamber, the master regulator having a regulating-pressure chamber at the opposite side of its diaphragm from its reduced-pressure chamber so that the diaphragm is exposed to gas pressure from both sides, means providing a communication passage between the reduced-pressure chamber of the pilot regulator and the regulating-pressure chamber of the master regulator, and means providing a restricted escape port in bleed-out relation from the reduced-pressure chamber of the pilot regulator to the reduced-pressure side of the master regulator.

4. Gas pressure regulator apparatus of the kind described, comprising the combination of a master regulator of the direct type and a pilot regulator of the inverse type, each of said regulators having a diaphragm, a high-pressure inlet, a reduced-pressure chamber on one side of the diaphragm and a connecting orifice between the high-pressure inlet and the reduced-pressure chamber, a valve member cooperating with such orifice, and an operative connection between the diaphragm and the valve member, such operative connection in the case of the master regulator being by a lever, whereas in the pilot regulator the operative connection is a pin passing through the orifice, the pilot regulator having an adjusting spring to act on its diaphragm in opposition to pressure in its reduced-pressure chamber, the master regulator having a regulating-pressure chamber at the opposite side of its diaphragm from its reduced-pressure chamber so that the diaphragm is exposed to gas pressure from both sides, means providing a communication passage between the reduced-pressure chamber of the pilot regulator and the regulating-pressure chamber of the master regulator, and means providing a restricted escape port in bleed-out relation from the reduced-pressure chamber of the pilot regulator.

5. Gas pressure regulator apparatus of the kind described, comprising the combination of a master regulator and a pilot regulator, each of said regulators having a diaphragm, a high-pressure inlet, a reduced-pressure chamber on one side of the diaphragm and a connecting orifice between the high-pressure inlet and the reduced-pressure chamber, a valve member cooperating with such orifice and an operative connection between the diaphragm and the valve member, the pilot regulator having a regulating spring to act on its diaphragm in opposition to pressure in its reduced-pressure chamber, the master regulator having a regulating pressure chamber at the opposite side of its diaphragm from its reduced-pressure chamber so that the diaphragm is exposed to gas pressure from both sides, means providing a communication passage between the reduced-pressure chamber of the pilot regulator and the regulating-pressure chamber of the master regulator, and means providing a restricted escape port in bleed-out relation from the reduced-pressure chamber of the pilot regulator, the gas passage through the orifice of the pilot regulator being still more restricted than said escape port.

6. Gas pressure regulator apparatus of the kind described, comprising the combination of a master regulator of the direct type and a pilot regulator of the inverse type, each of said regulators having a diaphragm, a high-pressure inlet, a reduced-pressure chamber and a connecting orifice, a valve member cooperating with such orifice, and an operative connection between the diaphragm and the valve member, such operative connection in the case of the master regulator being by a lever, the pilot regulator having an adjusting spring to act on its diaphragm in opposition to pressure in its reduced-pressure chamber, the master regulator having a regulating-pressure chamber at the opposite side of its diaphragm from its reduced-pressure chamber so that the diaphragm is exposed to gas pressure from both sides, means providing a communication passage between the reduced-pressure chamber of the pilot regulator and the regulating-pressure chamber of the master regulator, and means providing a restricted escape port in bleed-out relation from the reduced-pressure chamber of the pilot regulator, the gas passage between the thrust-pin and the orifice of the pilot regulator being still more restricted than said escape port.

7. Gas pressure regulator apparatus of the kind described, comprising the combination of a master regulator of the direct type and a pilot regulator of the inverse type, each of said regulators having a diaphragm, a high-pressure inlet, a reduced-pressure chamber on one side of the diaphragm and a connecting orifice between the high-pressure inlet and the reduced-pressure chamber, a valve member cooperating with such orifice and an operative connection between the diaphragm and the valve member, the pilot regulator having a regulating spring to act on its diaphragm in opposition to pressure in its reduced-pressure chamber, the master regulator having a friction brake operatively connected with the valve member and a regulating-pressure chamber at the opposite side of its diaphragm from its reduced-pressure chamber so that the diaphragm is exposed to gas pressure from both sides, means providing a communication passage between the reduced-pressure chamber of the pilot regulator and the regulating-pressure chamber of the master regulator, and means providing a restricted escape port in bleed-out relation from the reduced pressure chamber of the pilot regulator.

8. Gas pressure regulator apparatus of the kind described and as set forth in claim 7 with the friction brake including a stationary guide or pot, a split resilient annulus pressing outward against the wall of the guide, and means connecting the annulus with said connection between the diaphragm and the valve member.

9. In a gas pressure regulator comprising a housing, and valve-operating means within the housing including a diaphragm and a lever, a pot or guide and a friction element, one of which is operatively connected to the valve-operating means for movement therewith, and the other of which is fixed with respect to the housing, the friction element being resilient in a plane normal to the direction of relative movement of the friction element and guide, said friction element bearing against the inside wall of the pot or guide and being compressed by said wall of the pot or guide to cause substantial friction resisting relative movement of the friction element and guide, that portion of the wall against which the friction element bears being parallel to the direction of relative movement of the friction element and guide.

10. In a gas pressure regulator comprising valve-operating means including a diaphragm and a lever, said lever having a rounded crest at its end which bears against the diaphragm, a fixed cylindrical pot or guide, a split, cylindrical, resilient annulus pressing outward against the confining guide wall of the pot so that the friction of the annulus against the walls of the pot or guide resists the movement of said annulus, and a tongue secured to said annulus and having a hooked end engaged over said crest and confined between the same and the diaphragm.

11. In a gas pressure regulator comprising a lever for operatively connecting a valve element of the regulator with a diaphragm, a fixed pot having a cylindrical guide wall, a split, cylindrical, resilient annulus confined and pressing outwardly against the cylindrical guide wall of the pot, and means connecting the annulus with said lever so that friction of the annulus against the guide wall of the pot resists all movement of said lever.

12. In a gas pressure regulator apparatus, an inverse type pilot regulator; a direct type master regulator having two chambers; a diaphragm wall between the two chambers; pressure regulating valve mechanism in one of the chambers and controlled by the diaphragm; a conduit connecting the other chamber with the delivery pressure discharge of the pilot regulator so that the full delivery pressure from the pilot regulator will be exerted at all times against the diaphragm of the master regulator; and a restricted passage for limiting the gas flow into the pilot regulator to a very low value to prevent chilling of the gas by expansion.

13. Gas pressure regulator apparatus, comprising a master regulator of the direct type including a diaphragm, a regulating pressure chamber behind the diaphragm, a valve, and lever means operatively connecting the diaphragm and valve; and a pilot regulator of the inverse type with its output connected with the regulating pressure chamber of the master regulator.

14. Gas pressure regulator apparatus including a pilot regulator; a master regulator; a diaphragm dividing the interior of the master regulator into two chambers; pressure regulating valve mechanism in one of the chambers for controlling the flow of gas into that chamber; a conduit connecting the pilot regulator with the other chamber to supply gas under pressure for controlling the operation of the master regulator; and a minute bleed conduit through which the delivery side of the pilot regulator is at all times in direct communication with the delivery side of the master regulator so that when the demand on the apparatus is too light to operate the master regulator, the gas will be supplied through the bleed connection; and a restricted entrance to the pilot regulator for preventing a flow of gas into the regulator substantially greater than the flow through the bleed conduit during the normal operation of the apparatus.

GEORGE M. DEMING.